US011953030B2

(12) United States Patent
Schwab

(10) Patent No.: US 11,953,030 B2
(45) Date of Patent: Apr. 9, 2024

(54) HYDRAULIC SYSTEM FOR AN INDUSTRIAL TRUCK

(71) Applicant: STILL GmbH, Hamburg (DE)

(72) Inventor: Markus Schwab, Moelln (DE)

(73) Assignee: STILL GmbH, Hamburg (DE)

( * ) Notice: Subject to any disclaimer, the term of this patent is extended or adjusted under 35 U.S.C. 154(b) by 0 days.

(21) Appl. No.: 18/056,920

(22) Filed: Nov. 18, 2022

(65) Prior Publication Data

US 2023/0160400 A1 May 25, 2023

(30) Foreign Application Priority Data

Nov. 19, 2021 (DE) ..................... 10 2021 130 272.2

(51) Int. Cl.
*F15B 11/17* (2006.01)
*B66F 9/22* (2006.01)
*F15B 13/02* (2006.01)
*F15B 15/18* (2006.01)

(52) U.S. Cl.
CPC ................ *F15B 11/17* (2013.01); *B66F 9/22* (2013.01); *F15B 13/027* (2013.01); *F15B 15/18* (2013.01)

(58) Field of Classification Search
CPC .......... F04B 17/03; F04B 23/04; F04B 23/06; F15B 11/0426; F15B 11/161; F15B 11/165; F15B 2211/20515; F15B 2211/20538; F15B 2211/20576; F15B 2211/45
See application file for complete search history.

(56) References Cited

U.S. PATENT DOCUMENTS 3,975,909 A * 8/1976 McBurnett ............ E02F 9/2239 60/431
4,164,119 A * 8/1979 Parquet ................... F15B 11/17 60/486
4,212,165 A * 7/1980 Zirps ....................... F15B 11/17 91/530
4,558,629 A * 12/1985 Unger ..................... F15B 11/17 60/486
5,081,837 A * 1/1992 Ueno ....................... F15B 11/17 60/486
5,148,676 A * 9/1992 Moriya ................. E02F 9/2282 60/486
8,459,019 B2 * 6/2013 Hohensee ............ F04B 27/067 91/461

(Continued)

FOREIGN PATENT DOCUMENTS

CN 103950870 A 7/2014
DE 3406228 A1 * 8/1985 .............. F15B 11/17

(Continued)

*Primary Examiner* — Michael Leslie
(74) *Attorney, Agent, or Firm* — The Webb Law Firm

(57) ABSTRACT

A hydraulic system (1) for an industrial truck, in particular an electrically operated, battery-powered industrial truck, includes a lift drive (2) to raise and lower a load handling device. The hydraulic system (1) has a first hydraulic pump (5) which is configured to supply the lift drive (2) with hydraulic fluid, and a second hydraulic pump (6) which can be switched on by means of a valve device (7) for the supply of the lift drive (2). The first hydraulic pump (5) and the second hydraulic pump (6) are configured as a hydraulic double pump unit (1) and the valve device (7) is integrated into the hydraulic double pump unit (10).

18 Claims, 3 Drawing Sheets

(56) References Cited

U.S. PATENT DOCUMENTS

| | | | | |
|---|---|---|---|---|
| 8,668,465 | B2 * | 3/2014 | Wadsley | F04B 49/08<br>417/244 |
| 9,447,686 | B2 * | 9/2016 | Krebs | F01B 3/0044 |
| 11,142,888 | B2 * | 10/2021 | Lee | E02F 9/2228 |
| 11,168,710 | B2 * | 11/2021 | Huth | F04B 49/002 |
| 11,168,711 | B2 * | 11/2021 | Morrison | F15B 11/17 |
| 2008/0152513 | A1 | 6/2008 | Esders | |

FOREIGN PATENT DOCUMENTS

| | | | |
|---|---|---|---|
| DE | 19831828 | A1 | 1/2000 |
| DE | 102011053958 | A1 | 3/2013 |
| JP | 2001240390 | A | 9/2001 |

* cited by examiner

HYDRAULIC SYSTEM FOR AN INDUSTRIAL TRUCK

CROSS-REFERENCE TO RELATED APPLICATION

This application claims priority to German Patent Application No. 10 2021 130 272.2 filed Nov. 19, 2021, the disclosure of which is hereby incorporated by reference in its entirety.

BACKGROUND OF THE INVENTION

Field of the Invention

The invention relates to a hydraulic system for an industrial truck, in particular a battery-powered electric industrial truck, with a lift drive to raise and lower a load handling device, wherein the hydraulic system has a first hydraulic pump that is designed to supply the lift drive with hydraulic fluid and a second hydraulic pump that can be actuated by means of a valve device for the supply of the lift drive.

Description of Related Art

Hydraulic systems of this type are generally used in battery-powered electric industrial trucks such as counterbalanced fork lift trucks or reach trucks, for example.

On battery-powered electric industrial trucks such as counterbalanced fork lift trucks or reach trucks, for example, hydraulic systems are known in which a single hydraulic pump is provided which supplies hydraulic fluid to the lift drive, with which a load handling device can be raised and lowered, as well as to optional additional consumers of a hydraulic work system, such as a tilting drive and/or a sideshifter drive.

The maximum displacement volume of the hydraulic pump that is driven by an electric drive motor, for example, is determined by the maximum load pressure on the lift drive and the output limit of the electric drive motor that drives the hydraulic pump.

In the event that the load handling device is to be lifted/raised with no load, i.e. lifted at a low load pressure, a significantly higher displacement volume of the hydraulic pump can be used than when the load handling device is lifted with a nominal load, i.e. lifted at a high load pressure, given the same torque or power curve of the electric drive motor.

On hydraulic systems of industrial trucks with a single hydraulic pump which supplies the lift drive with hydraulic fluid, an additional increase of the lifting speed of the load handling device can be achieved only by increasing the driving speed of the hydraulic pump. However, the lifting speed during no-load lifting is limited on account of the maximum requirement during lifting with a nominal load (torque limit or power output limit of the drive motor of the hydraulic pump) in the form of the pump size, i.e. of the displacement volume of the hydraulic pump, and the maximum driving speed of the hydraulic pump.

Especially on reach trucks, on which the lift drive makes possible a lifting height of the load handling means of more than 8 m, for example, higher no-load lifting speeds are advantageous to increase the cargo handling capacity of the reach truck. On account of the power output limit of the electric drive motor of the hydraulic pump, however, the maximum displacement volume of the hydraulic pump is defined by the maximum load pressure at nominal load.

To achieve higher lifting speeds of the load handling means, hydraulic systems of industrial trucks are known in which the hydraulic system has two hydraulic pumps. In these cases, a first hydraulic pump supplies the lift drive with hydraulic fluid under all operating conditions. To achieve higher lifting speeds of the load handling means, a second hydraulic pump is provided, which can be actuated as necessary by means of a valve device for the supply of the lift drive.

A hydraulic system of this type for an industrial truck with two hydraulic pumps in which the first hydraulic pump supplies the lift drive with hydraulic fluid under all operating conditions and a second hydraulic pump is actuated for the supply of the lift drive to achieve higher lifting speeds of the load handling device is known from DE 198 31 828 B1. In DE 198 31 828 B1, the first hydraulic pump and the second hydraulic pump are two separate hydraulic pump units, which results in a more complex and expensive construction. The second hydraulic pump is further connected via its own connecting line with the lift drive, as a result of which the cost and complexity of the construction is further increased as a result of the higher piping and assembly cost and effort required.

SUMMARY OF THE INVENTION

An object of the present invention is to make available a hydraulic system for an industrial truck.

According to the invention, this object is accomplished in that the first hydraulic pump and the second hydraulic pump are in the form of a two-pump hydraulic unit and the valve device is integrated into the two-pump hydraulic unit.

According to the invention, the two hydraulic pumps therefore form a two-pump hydraulic unit into which the valve device, by means of which the second hydraulic pump can be switched on to supply the lift drive, is integrated and therefore incorporated.

The combination of the two hydraulic pumps into one two-pump hydraulic unit results in particular in a reduced construction cost. The integration and therefore the incorporation of the valve device into the two-pump hydraulic unit results in a further reduction of the construction cost because the second hydraulic pump does not require its own connecting line for the connection to the lift drive, so that the cost for the piping of the second hydraulic pump to the lift drive and the related assembly cost and effort can be eliminated.

According to one advantageous embodiment of the invention, the two-pump hydraulic unit preferably has a housing and the valve device is incorporated into the housing. Consequently, a simpler incorporation and integration of the valve device into the two-pump hydraulic unit can be achieved.

According to one advantageous embodiment of the invention, an intake channel is preferably formed in the housing which is connected with an intake port of the first hydraulic pump and with an intake port of the second hydraulic pump, a first delivery channel is formed which is connected with a delivery port of the first hydraulic pump, and a second delivery channel is formed which is connected with a delivery port of the second hydraulic pump and with the first delivery channel. With the intake channel in the housing, the intake ports of the two hydraulic pumps can be connected, preferably in a simple manner, with a reservoir for the intake of hydraulic fluid. At the first delivery channel, which is connected with the delivery port of the first hydraulic pump and which is connected with the second delivery channel which is connected with the delivery port of the second hydraulic pump, the lift drive can preferably be connected in a simple manner with both hydraulic pumps by means of a connecting line.

According to one advantageous embodiment of the invention, the valve device preferably has a switched on position in which the delivery port of the second hydraulic pump is connected with the first delivery channel, and a switched off position in which the delivery port of the second hydraulic pump is connected with the intake channel. In the switched off position, therefore, by means of a connection of the delivery port of the second hydraulic pump with the intake channel, the second hydraulic pump can be short-circuited in a simple manner to the intake channel or to a reservoir connected to it. In the switched on position, therefore, by means of a connection of the delivery port of the second hydraulic pump with the first delivery channel, the second hydraulic pump can be connected to supply the lift drive and to increase the lifting speed of the load handling device.

According to one advantageous configuration of the invention, the valve device preferably has a check valve, in particular a spring-loaded check valve, located in the second delivery channel and opening toward the first delivery channel, as well as a control valve device which is located in a connecting channel that connects the second delivery channel with the intake channel. The connection of the delivery port of the second hydraulic pump with the first delivery channel can be controlled in a particularly simple manner with the check valve. With the control valve device, which is located in the connecting channel connecting the second delivery channel with the intake channel, in particular the connection of the delivery port of the second hydraulic pump with the intake channel can be controlled in a simple manner.

According to one advantageous embodiment of the invention, the control valve device preferably has a closed position that forms the switched on position and an open position that forms the switched off position. In the closed position of the control valve device, the connection of the delivery port of the second hydraulic pump with the intake channel is preferably shut off. As a result, the delivery port of the second hydraulic pump can preferably be connected via the opening check valve with the first delivery channel. In the open position of the control valve device, the delivery port of the second hydraulic pump can preferably be connected with the intake channel.

According to an alternative and likewise advantageous embodiment of the invention, the valve device preferably has a control valve device which is located in the second delivery channel and is connected to a connecting channel that is connected with the intake channel. With a control valve device of the type described, the connection of the delivery port of the second hydraulic pump with the first delivery channel and the connection of the delivery port of the second hydraulic pump with the intake channel can preferably be controlled in a simple manner.

According to one advantageous embodiment of the invention, the control valve device preferably has a control position that forms the switched on position in which the second delivery channel is open and the connection of the second delivery channel with the connecting channel is shut off, and a second control position that forms the switched off position in which the second delivery channel is connected with the connecting channel and the connection of the second delivery channel with the first delivery channel is shut off. In the first control position, in particular the connection of the delivery port of the second hydraulic pump with the first delivery channel for the switched on position can be established in a simple manner. In the second switched position, in particular the connection of the delivery port of the second hydraulic pump with the intake channel for the shutoff position can be established According to one advantageous embodiment of the invention, the control valve device can preferably be a multi-way valve or a proportional valve.

According to one advantageous embodiment of the invention, preferably the control valve device can be actuated electrically by means of an electric actuator device, in particular by means of a magnet. With an electric actuator device, the control valve device can be actuated in a simple manner between the switched on position and the switched off position.

According to one advantageous embodiment of the invention, an electronic control device is preferably provided which is in communication on the input side with an operating element and on the output side with the valve device for its actuation, wherein the electronic control device is configured so that the valve device is controlled as a function of the actuation of the operating element. As a result, the valve device can be actuated in a simple manner as a function of the actuation of the operating element, such as a lever or switch, for example, by an operator of the industrial truck into the switched on position or the switched off position.

According to one advantageous configuration of the invention, the electronic control device is preferably designed so that when the operating element is actuated, the valve device is actuated into the switched on position or into the switched off position, and when the operating element is not actuated, the valve device is actuated into the switched off position or into the switched on position. By actuating the operating element, for example, an operator of the industrial truck can activate the switched on position in a simple manner to request a higher lifting speed from the lift drive.

According to one advantageous embodiment of the invention, preferably an electronic control device is provided which is in communication on the input side with a sensor device that measures the load pressure on the lift drive and on the output side with the valve device for its actuation, wherein the electronic control device is configured so that the valve device is controlled as a function of the load pressure on the lift drive. As a result, in particular the valve device can be actuated in a simple manner as a function of the current load pressure on the lift drive into the switched on position or the switched off position.

According to one advantageous configuration of the invention, the electronic control device is preferably designed so that the valve device is actuated into the switched on position at a load pressure on the lift drive below a limit load pressure, and is actuated into the switched off position at a load pressure on the lift drive above the limit load pressure. As a result, in particular in a simple manner, the second hydraulic pump can be switched on during a no-load lift or during a lifting operation in the partial-load range to achieve a higher lifting speed during a no-load lifting or during the lifting of a partial load.

According to one advantageous embodiment of the invention, the first hydraulic pump and the second hydraulic pump are preferably driven by a common drive motor, in particular an electric motor. Because the second hydraulic pump can be switched on and switched off as necessary by the valve device, in particular both hydraulic pumps can be driven by a common drive motor, as a result of which the cost of construction of the hydraulic system can be further reduced.

The invention has a series of advantages.

As a result of the switching on of the second hydraulic pump, for example at load pressures during lifting that are below the limit load pressure, significantly higher lifting speeds of the load handling device can be achieved with partial loads or no loads with a significantly smaller size of the drive motor that drives the hydraulic pumps.

The invention further makes possible a downsizing of the drive motor which drives the hydraulic pumps, because during lifting at the nominal load and therefore a high load pressure on the lift drive, the pump volume can be reduced by switching off the second hydraulic pump.

The second hydraulic pump can be switched off when the drive motor is started to achieve high starting speeds of the first hydraulic pump. Consequently a long useful life of bearings, in particular sliding-contact bearings, of the hydraulic pumps can be achieved.

The result is a further cost optimization because the integration of the valve device into the hydraulic double pump unit makes it possible to eliminate the cost of piping for the second hydraulic pump with the lift drive and the related costs of installation.

In connection with an operating element that can be actuated by an operator of the industrial truck, for example a lever or switch, which can additionally be actuated by a lift-drive-operating element such as a joystick that controls the lifting operation, the operator can actively initiate a boost function with an increased lifting speed during lifting operation of the lift drive by an additional actuation of the operating element.

With the invention, it also becomes possible in a simple manner to create a variant model of a standard industrial truck with a single hydraulic pump and a high-performance industrial truck with a hydraulic system according to the invention with a hydraulic double pump unit, because this variant model can be produced in the industrial trucks in a simple manner by two pump variants, namely a single pump and a hydraulic double pump unit according to the invention, without additional modifications or adaptations to the hydraulic systems of the industrial trucks.

BRIEF DESCRIPTION OF THE DRAWINGS

Additional advantages and details of the invention are described in greater detail below with reference to the exemplary embodiments illustrated in the accompanying schematic figures, in which.

DESCRIPTION OF THE INVENTION

Figure 1:
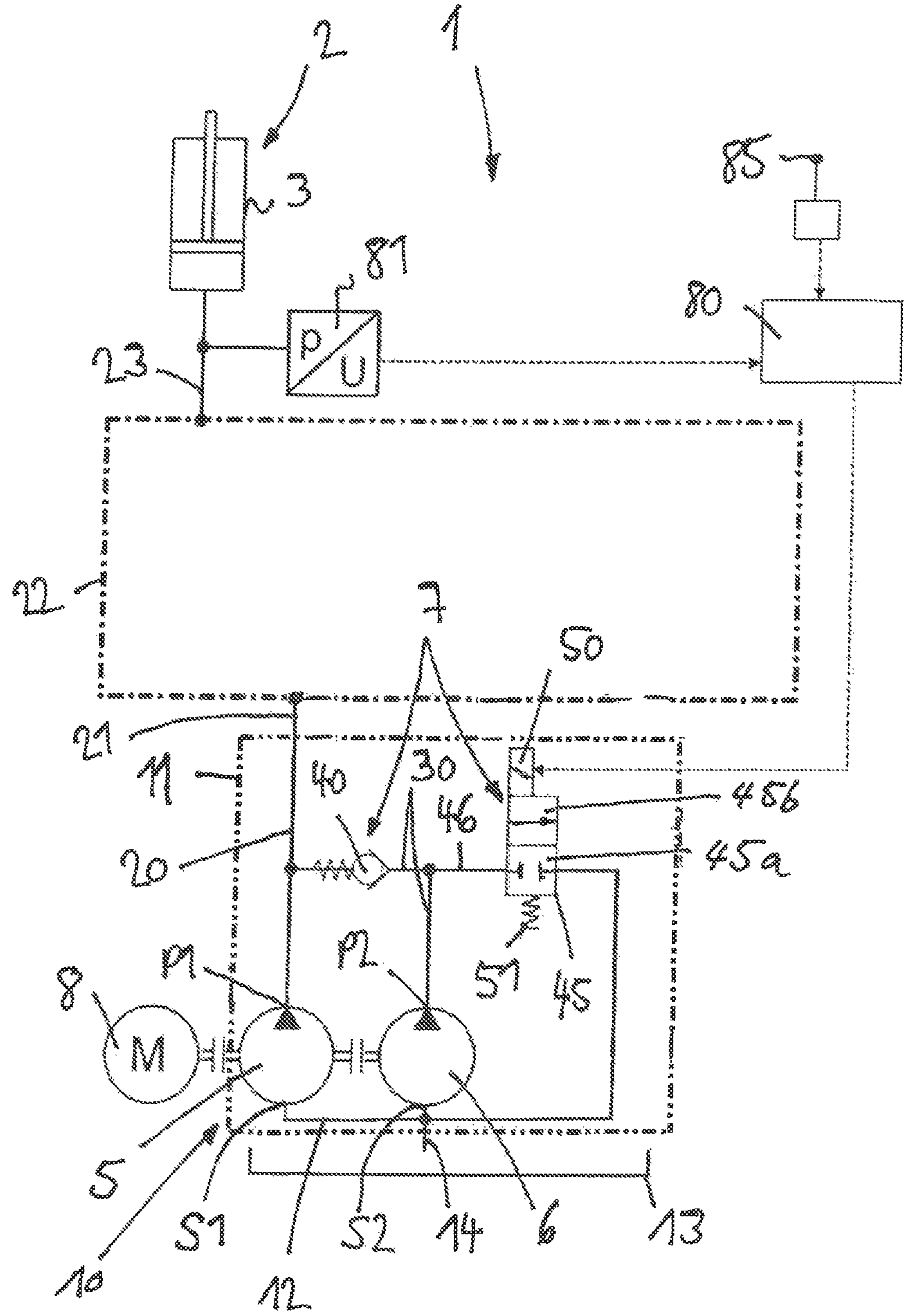
FIG. 1 is a circuit diagram of a first embodiment of the invention.
Figure 2:
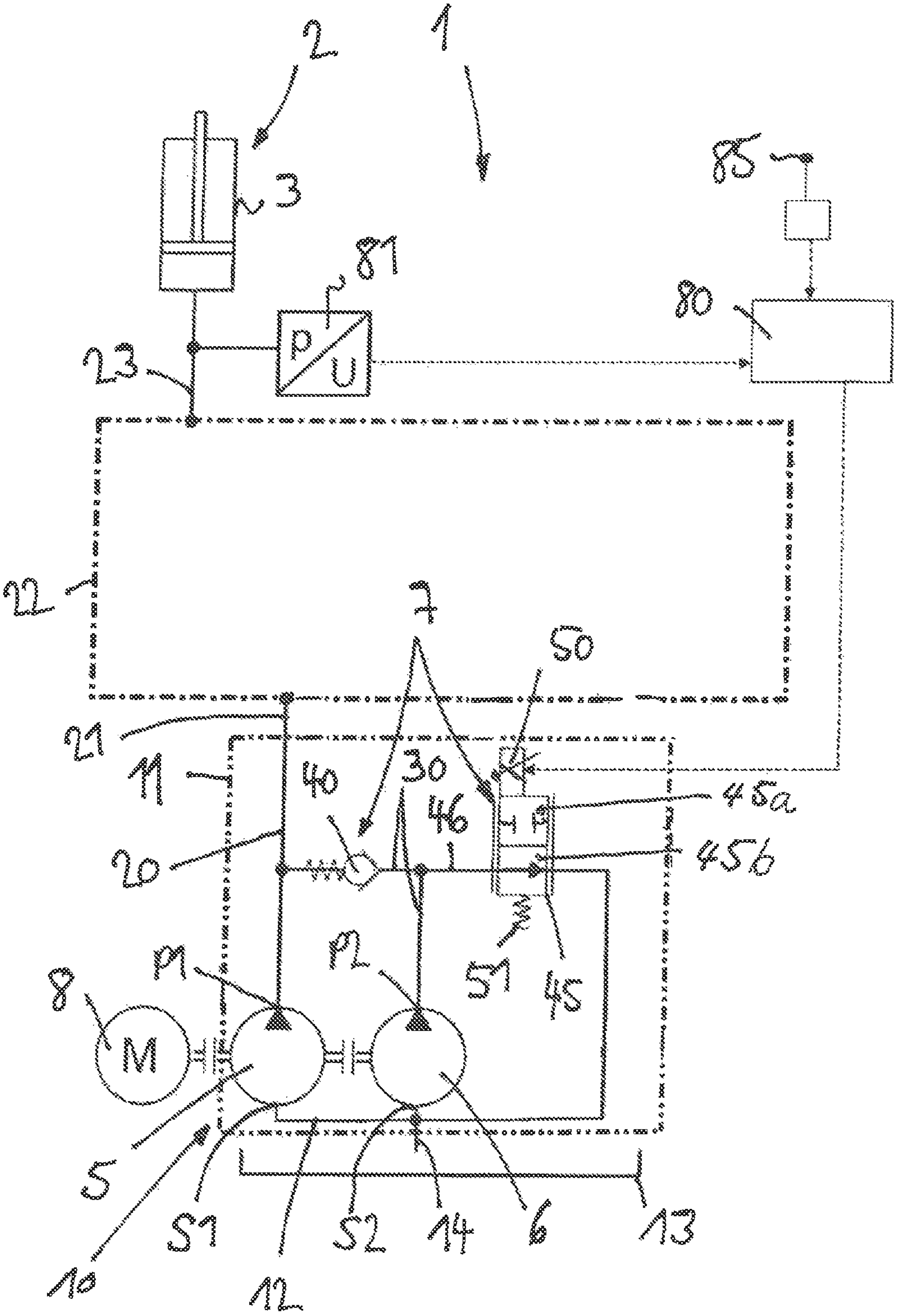
FIG. 2 is a variant of the first embodiment illustrated in FIG. 1.
Figure 3:
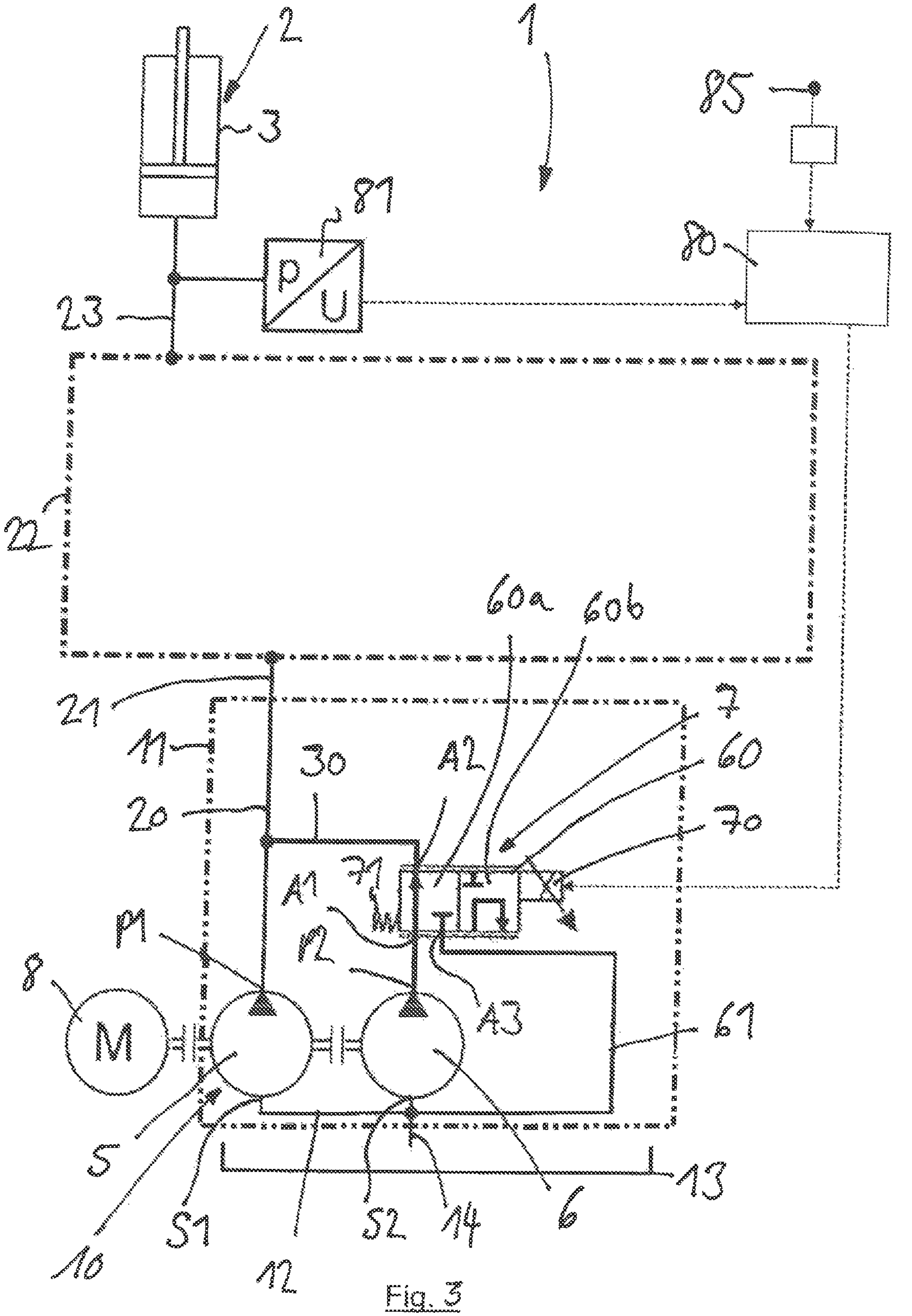
FIG. 3 is a circuit diagram of a second embodiment of the invention.

In FIGS. 1 to 3, identical components are identified by the same reference numbers.

FIGS. 1 to 3 each show a hydraulic system 1 of an industrial truck, for example of a battery-powered, electrically operated industrial truck.

The hydraulic system 1 has a lift drive 2 to raise and lower a load handling device which is not illustrated in any further detail, such as a load fork comprising forks. In the illustrated exemplary embodiment, the lift drive 2 has one or more lifting cylinders 3.

The hydraulic system 1 has a first hydraulic pump 5 which supplies the lift drive 2 with hydraulic fluid and a second hydraulic pump 6 which can be switched on by means of a valve device 7 for the supply of the lift drive 2.

A common drive motor 8 is provided for the drive of the first hydraulic pump 5 and the second hydraulic pump 6. In the illustrated exemplary embodiment, the drive motor 8 is an electric motor.

The first hydraulic pump 5 and the second hydraulic pump 6 are in the form of a hydraulic double pump unit 10. The valve device 7 is integrated and thereby incorporated into the hydraulic double pump unit 10.

For this purpose the hydraulic double pump unit 10 has a housing 11 into which the valve device 7 is incorporated.

The first hydraulic pump 5 has an intake port S1 and a delivery port P1. Correspondingly, the second hydraulic pump 5 has an intake port S2 and a delivery port P2.

In the housing 11 of the hydraulic double pump unit 10 there is an intake channel 12 which is connected with the intake port S1 of the first hydraulic pump 5 and with the intake port S2 of the second hydraulic pump 6. The intake channel 12 is also in communication with a reservoir 13, for example by means of a reservoir line 14 connected to the intake channel 12, from which the two hydraulic pumps 5, 6 take in hydraulic fluid.

In the housing 11 of the hydraulic double pump unit 10 there is a first delivery channel 20 which is connected with the delivery port P1 of the first hydraulic pump 5. A connecting line 21 is connected to the first delivery channel 20 and connects the first delivery channel 20 with a multi-way valve block 22 of the hydraulic system 1. The lifting cylinder 3 is connected to the multi-way valve block 22 by means of an additional connecting line 23. The multi-way valve block 22 is provided with a multi-way control valve device with which the lifting operation and the lowering operation of the lift drive 2 can be controlled. In the lifting operation of the lift drive 2, the first delivery channel 20 is connected by means of the multi-way control valve device with the connecting line 23. In the lowering operation of the lift drive 2, the connecting line 23 is connected by means of the multi-way control valve device with the reservoir 13.

It is noted that additional hydraulic consumers can be connected to the multi-way control valve block 22 and controlled by means of corresponding multi-way control valve devices, for example a tilting operation of the load handling device and/or a sideshifter of the load handling device.

In the housing 11 of the hydraulic double pump unit 10 there is also a second delivery channel 30 which is connected with the delivery port P2 of the second hydraulic pump 6. The second delivery channel 30 is also connected to the first delivery channel 20 inside the housing 11.

The valve device 7 illustrated in FIGS. 1 to 3 has a switched on position in which the delivery port P2 of the second hydraulic pump 6 is connected with the first delivery channel 20, and a switched off position in which the delivery port P2 of the second hydraulic pump 6 is connected with the intake channel 12.

In the exemplary embodiments illustrated in FIGS. 1 and 2, the valve device 7 has a check valve 40 located in the second delivery channel 30, which opens toward the first delivery channel 20. In the exemplary embodiments illustrated in FIGS. 1 and 2, the check valve 40 is a spring-loaded check valve. The valve device 7 in FIGS. 1 and 2 also has a control valve device 45 which is located in a connecting channel 46 that connects the second delivery channel 30 with the intake channel 12. The connecting channel 46 is connected to the second delivery channel 30 between the delivery port P2 and the check valve 40 and leads to the intake channel 12.

In the exemplary embodiments illustrated in FIGS. 1 and 2, the control valve device 45 is a two-port, two-position valve and has a closed position 45*a* that forms the switched on position and an open position 45*b* that forms the switched off position.

In the exemplary embodiment illustrated in FIG. 1, the control valve device 45 is a switch valve.

In the exemplary embodiment illustrated in FIG. 2, the control valve device 45 is a proportional valve that has a throttling action in intermediate positions.

In the exemplary embodiment illustrated in FIG. 1, the control valve device 45 can be actuated electrically by means of an electric actuator device 50, such as by means of a magnet, in particular a switching magnet, for example. In the exemplary embodiment illustrated in FIG. 1, the control valve device can be actuated by means of a spring 51 toward the closed position 45*a* and by means of the electric actuator device 50 toward the open position 45*b*.

In the exemplary embodiment illustrated in FIG. 2, the control valve device 45 can be actuated electrically by means of an electric actuator device 50, such as by means of a magnet, in particular a proportional-action magnet, for example. In the exemplary embodiment illustrated in FIG. 2, the control valve device can be actuated toward the open position 45*a* by means of a spring 51 and toward the closed position 45*a* by means of the electric actuator device 50.

In the exemplary embodiment illustrated in FIG. 3, the valve device 7 has a control valve device 60 which is located in the second delivery channel 30 and is connected to a connecting channel 61 connected with the intake channel 12.

In the illustrated exemplary embodiment, the control valve device 60 is a three-port, two-position valve which is connected at a first port A1 to the segment of the second delivery channel 30 in communication with the delivery port P2 of the second hydraulic pump 6, at a second port A2 to the segment of the second delivery channel 30 in communication with the first delivery channel 20 and at a third port A3 to the connecting channel 61.

The control valve device 60 has a first control position 60*a* that forms the switched on position, in which the first port A1 is connected with the second port A2 and the third port A3 is shut off. In the control position 60*a*, therefore, the second delivery channel 30 is open and the connection of the second delivery channel 30 with the connecting channel 61 is closed. The control valve device 60 has a second control position 60*b* that forms the switched off position, in which the first port A1 is connected with the third port A3 and the second port A2 is closed. In the control position 60*b*, therefore, the second delivery channel 30 is connected with the connecting channel 61 and the connection of the second delivery channel 30 with the first delivery channel 20 is closed.

In the exemplary embodiment illustrated in FIG. 3, the control valve device 60 is a proportional valve that has a throttling action in intermediate positions. Alternatively, the control valve device 60 can be a switch valve.

In the exemplary embodiment illustrated in FIG. 3, the control valve device 60 can be actuated electrically by means of an electric actuator device 70, such as by means of a magnet, in particular a proportional-action magnet, for example. In the illustrated exemplary embodiment, the control valve device 60 can be actuated toward the first control position 60*a* by means of a spring 71 and toward the second control position 60*b* by means of the electric actuator device 50. Alternatively, the control valve device 60 can be actuated toward the second control position 60*b* by means of a spring 71 and toward the first control position 60*a* by means of the electric actuator device 70.

For the actuation of the valve device 7 formed by the control valve device 45 in FIGS. 1 and 2 or the control valve device 60 in FIG. 3, an electronic control device 80 is provided which is in communication on the input side with a sensor device 81 that measures the load pressure of the lift drive 2 present in the connecting line 23, and is in communication on the output side with the actuator device 50 or 70. The electronic control device 80 is designed so that the control valve device 45 or 60 of the control valve device 7 is controlled as a function of the load pressure on the lift drive 2.

The electronic control device 80 is designed so that the valve device 7 is actuated into the switched on position at a load pressure on the lift drive 2 below a limit load pressure, and is actuated into the switched off position at a load pressure on the lift drive 2 above the limit load pressure.

In FIGS. 1 and 2, for this purpose the control valve device 45 is actuated by the control device 80 during lifting operation of the lift drive 2, when a load pressure on the lift drive 2 measured by means of the sensor device 81 is below the limit load pressure, into the closed position 45*a* that forms the switched on position 45*a*, and by the control device 80, during lifting operation of the lift drive 2 at a load pressure on the lift drive 2 measured by means of the sensor device 81 above the limit load pressure into the open position 45*b* that forms the switched off position.

In FIG. 3, for this purpose the control valve device 60 is actuated by the control device 80 during lifting operation of the lift drive 2, when a load pressure on the lift drive 2 measured by means of the sensor device 81 is below the limit load pressure, into the first control position 60*a* that forms the switched on position, and by the control device 80, during lifting operation of the lift drive 2 at a load pressure on the lift drive 2 measured by means of the sensor device 81 above the limit load pressure into the second control position 60*b* that forms the switched off position.

In the switched on position of the valve device 7 in FIGS. 1 to 3, it therefore becomes possible to achieve an increased lifting speed of the load handling device.

Alternatively or additionally, the electronic control device 80 can be in communication on the input side with an operating element 85 such as a lever or switch, for example, which can be actuated by the operator of the industrial truck, and on the output side with the actuator device 50 or 70, wherein the electronic control device 80 is designed so that the control valve device 45 or 60 of the valve device 7 is controlled as a function of the actuation of the operating element 85.

The electronic control device 80 is configured, for example, so that when the operating element 85 is actuated, the valve device 7 is actuated into the switched on position, and when the operating element of not actuated, the valve device 7 is actuated into the switched off position.

In FIGS. 1 and 2, for this purpose the control valve device 45 is actuated by the control device 80 during lifting operation of the lift drive 2 when the operating element 85 is additionally actuated into the closed position 45*a* that forms the switched on position, and by the control device 80 during lifting operation of the lift drive 2, when the operating element 85 is not actuated, into the open position 45*b* that forms the switched off position.

In FIG. 3, for this purpose the control valve device 60 is actuated by the control device 80 during lifting operation of the lift drive 2 when the operating element 85 is also actuated into the first control position 60*a* that forms the switched on position, and by the control device 80 during lifting operation of the lift drive 2 when the operating element 85 is not actuated into the second control position 60*b* that forms the switched off position.

When the lift drive 2 is in lifting operation, the operator, by additionally actuating the operating element 85, can actively activate the switched on position of the valve device 7 in FIGS. 1 to 3 and therefore order an increased lifting speed of the load handling device.

Alternatively, the electronic control device 80 can be configured, for example, so that when the operating element 85 is actuated, the valve device 7 is actuated into the switched off position, and when the operating element is not actuated, the valve device 7 is actuated into the switched on position.

In the hydraulic system 1 according to the invention, the valve device 7 is integrated into the hydraulic double pump unit 10. The second hydraulic pump 6 is switched on and off as a function of the load pressure during lifting operation of the lift drive 2, as measured by the sensor device 81 in the connecting line 23 that leads to the lift drive 2. Alternatively or additionally, the second hydraulic pump 6 can be switched on or off as a function of the actuation of the operating element 85.

In the hydraulic system 1 according to the invention, if the flow of the second hydraulic pump 6 is not required and the valve device 7 is in the switched off position, the volume flow of the second hydraulic pump 6 is short-circuited directly to the intake channel 12 of the two hydraulic pumps 5, 6 inside the housing 11. In the hydraulic system 1 according to the invention, if the volume flow of the second hydraulic pump 6 is required to increase the lifting speed of the load handling device and the valve device 7 is in the switched on position, the volume flow of the second hydraulic pump 6 is transported directly inside the housing 11 into the first delivery channel 20. The second hydraulic pump 6 therefore does not require any external hoses or piping.

If the load pressure on the lift drive 2 in lifting operation is below the defined limit load pressure, e.g. 100 bar, the second hydraulic pump 6 can be switched on in the closed position 45*a* of the control valve device 45 in FIGS. 1 and 2 or in the first control position 60*a* of the control valve device 60 in FIG. 3. It is therefore possible to achieve very high lifting speeds of the load handling device without a load and with a partial load. If, during lifting operation, the load pressure on the lift drive 2 exceeds the defined limit load pressure and, therefore, the pump torque of the two hydraulic pumps 5, 6 exceeds the maximum torque or the maximum output of the drive motor 8, the second hydraulic pump 6 is short-circuited to the intake channel 12 and, therefore, to the reservoir 13 by an actuation of the control valve device 45 in FIGS. 1 and 2 into the open position 45*b* or the control valve device 60 in FIG. 3 is actuated into the second control position 60*b*. During lifting operation, at a load pressure on the lift drive 2 that is above the defined limit load pressure, only the first hydraulic pump 5 therefore acts to lift the load handling device. The check valve 40 in FIGS. 1 and 2 thereby prevents a short-circuiting of the first hydraulic pump 5 to the reservoir 13.

The invention is not restricted to the exemplary embodiments illustrated in FIGS. 1 to 3.

In FIG. 1, the control valve device 45 can alternatively be a proportional valve.

In FIG. 2, the control valve device 45 can alternatively be a switch valve.

In FIG. 3, the control valve device 60 can alternatively be a switch valve.

The invention claimed is:

1. A hydraulic system for an industrial truck comprising:
- a lift drive to raise and lower a load handling device, wherein the lift drive comprises a lifting cylinder;

the hydraulic system further comprising:
- a first hydraulic pump which is configured to supply the lift drive with hydraulic fluid, and
- a second hydraulic pump which can be switched on by a valve device to supply the lift drive with additional hydraulic fluid,
- a first delivery channel connected with the first hydraulic pump;
- a second delivery channel to connect the second hydraulic pump with the first delivery channel;
- wherein the first hydraulic pump and the second hydraulic pump are configured as a hydraulic double pump unit and the valve device is integrated into the hydraulic double pump unit;
- a multi-way valve block connected to the hydraulic double pump unit and with which a lifting operation and a lowering operation of the lift drive is controlled; and
- a connecting line that connects the first delivery channel to the multi-way valve block.

2. The hydraulic system according to claim 1, wherein the hydraulic double pump unit comprises a housing and the valve device is incorporated into the housing.

3. The hydraulic system according to claim 2, wherein an intake channel is formed in the housing and is connected with an intake port of the first hydraulic pump and with an intake port of the second hydraulic pump, wherein the first delivery channel is formed in the housing which is connected with a delivery port of the first hydraulic pump, and wherein the second delivery channel is formed in the housing which is connected with a delivery port of the second hydraulic pump and with the first delivery channel.

4. The hydraulic system according to claim 3, wherein the valve device has a switched on position in which the delivery port of the second hydraulic pump is connected with the first delivery channel, and a switched off position in which the delivery port of the second hydraulic pump is connected with the intake channel.

5. The hydraulic system according to claim 4, wherein the valve device has a check valve located in the second delivery channel and opening toward the first delivery channel, and wherein the valve device has a control valve device which is located in a connecting channel that connects the second delivery channel with the intake channel.

6. The hydraulic system according to claim 5, wherein the control valve device has a closed position that forms the switched on position and an open position that forms the switched off position.

7. The hydraulic system according to claim 4, wherein the valve device has a control valve device which is located in the second delivery channel and is connected to a connecting channel that is connected with the intake channel.

8. The hydraulic system according to claim 7, wherein the control valve device has a first control position that forms the switched on position in which the second delivery channel is open and the connection of the second delivery channel with the connecting channel is shut off, and a second control position that forms the switched off position in which the second delivery channel is connected with the connecting channel and the connection of the second delivery channel with the first delivery channel is shut off.

9. The hydraulic system according to claim 5, wherein the control valve device is in the form of a switched valve or a proportional valve.

10. The hydraulic system according to claim 5, wherein the control valve device is actuated electrically by an electric actuator device.

11. The hydraulic system according to claim 4, wherein an electronic control device is provided which is in communication on the input side with an operating element and on the output side with the valve device for actuation, and wherein the electronic control device is configured so that the valve device is controlled as a function of the actuation of the operating element.

12. The hydraulic system according to claim 11, wherein the electronic control device is configured so that when the operating element is actuated, the valve device is actuated into the switched on position or into the switched off position, and when the operating element is not actuated, the valve device is actuated into the switched off position or into the switched on position.

13. The hydraulic system according to claim 4, wherein an electronic control device is provided which is in communication on the input side with a sensor that measures the load pressure on the lift drive and on the output side with the valve device for actuation, and wherein the electronic control device is configured so that the valve device is controlled as a function of the load pressure on the lift drive.

14. The hydraulic system according to claim 13, wherein the electronic control device is configured so that the valve device is actuated into the switched on position at a load pressure on the lift drive below a limit load pressure, and is actuated into the switched off position at a load pressure on the lift drive above the limit load pressure.

15. The hydraulic system according to claim 1, wherein the first hydraulic pump and the second hydraulic pump are driven by a common drive motor.

16. The hydraulic system according to claim 7, wherein the control valve device is in the form of a switched valve or a proportional valve.

17. The hydraulic system according to claim 7, wherein the control valve device is actuated electrically by an electric actuator device.

18. The hydraulic system according to claim 15, wherein the common drive motor comprises an electric motor.

* * * * *